(12) United States Patent  (10) Patent No.: US 8,214,548 B2
Sekine et al.  (45) Date of Patent: Jul. 3, 2012

(54) CAPABILITY-BASED CONTROL DEVICE DRIVER OF A COMPUTER PERIPHERAL DEVICE

(75) Inventors: Hitoshi Sekine, Los Altos, CA (US);
Alain Regnier, Sunnyvale, CA (US);
Yao-Tian Wang, Sunnyvale, CA (US);
Yue Liu, San Jose, CA (US); Senthil Selvaraj, Snoquaimie, WA (US);
Zhenning Xiao, Renton, WA (US)

(73) Assignee: Ricoh Company, Ltd., Tokyo (JP)

( * ) Notice: Subject to any disclaimer, the term of this patent is extended or adjusted under 35 U.S.C. 154(b) by 66 days.

(21) Appl. No.: 11/846,884

(22) Filed: Aug. 29, 2007

(65) Prior Publication Data

US 2009/0063710 A1  Mar. 5, 2009

(51) Int. Cl.
*G06F 3/00* (2006.01)
(52) U.S. Cl. .......................................... 710/15
(58) Field of Classification Search ...... 710/15
See application file for complete search history.

(56) References Cited

U.S. PATENT DOCUMENTS

| | | |
|---|---|---|
| 5,467,434 A | 11/1995 | Hower et al. |
| 5,487,168 A | 1/1996 | Geiner et al. |
| 5,513,126 A | 4/1996 | Harkins et al. |
| 5,768,483 A | 6/1998 | Maniwa et al. |
| 5,845,076 A | 12/1998 | Arakawa |
| 5,875,350 A | 2/1999 | Comp et al. |
| 5,996,029 A | 11/1999 | Sugiyama et al. |
| 5,999,945 A | 12/1999 | Lahey et al. |
| 6,148,346 A | 11/2000 | Hanson |
| 6,351,320 B1 | 2/2002 | Shin |
| 6,453,127 B2 | 9/2002 | Wood et al. |
| 6,480,209 B1 | 11/2002 | Jin |
| 6,501,472 B1 | 12/2002 | Hunt et al. |
| 6,577,907 B1 | 6/2003 | Czyszczewski et al. |
| 6,587,217 B1 | 7/2003 | Lahey et al. |
| 6,631,010 B1 | 10/2003 | Foster et al. |

(Continued)

FOREIGN PATENT DOCUMENTS

EP  1 209 558 A2  5/2002

(Continued)

OTHER PUBLICATIONS

European Patent Office, "European Search Report", application No. 08163180.6-2211, dated Nov. 11, 2008, 10 pages.

(Continued)

*Primary Examiner* — Henry Tsai
*Assistant Examiner* — Juanito Borromeo
(74) *Attorney, Agent, or Firm* — Hickman Palermo Truong Becker Bingham Wong LLP

(57) ABSTRACT

In an embodiment, a computer-implemented method comprises sending, to a computer peripheral device, a request to obtain capabilities of the computer peripheral device; receiving a first capability description from the computer peripheral device, wherein the first capability description describes one or more capabilities, features or functions of the device at the time of the request; creating one or more graphical user interface (GUI) elements based upon the first capability description and causing displaying the GUI elements; receiving user input representing one or more selections of the GUI elements; creating job ticket data that describes a job for the computer peripheral device to perform, based on the GUI elements that were selected as represented in the user input; sending the job ticket data to the peripheral device; wherein the job ticket data describes one or more device settings that the computer peripheral device can transform to device commands.

13 Claims, 7 Drawing Sheets

U.S. PATENT DOCUMENTS

| | | |
|---|---|---|
| 6,789,111 B1 | 9/2004 | Brockway et al. |
| 6,867,876 B1 | 3/2005 | Czyszczewski et al. |
| 6,898,624 B2 | 5/2005 | Young et al. |
| 6,952,831 B1 | 10/2005 | Moore |
| 6,967,728 B1 | 11/2005 | Vidyanand |
| 6,975,820 B2 | 12/2005 | Wong |
| 6,980,312 B1 | 12/2005 | Czyszczewski et al. |
| 7,002,703 B2 | 2/2006 | Parry |
| 7,062,721 B2 | 6/2006 | Jin |
| 7,120,910 B2 | 10/2006 | Matsuda et al. |
| 7,136,941 B2 | 11/2006 | Nguyen |
| 7,143,150 B1 | 11/2006 | Nuggehalli |
| 7,174,534 B2 | 2/2007 | Chong et al. |
| 7,180,616 B2 | 2/2007 | Miyoshi et al. |
| 7,289,235 B2 | 10/2007 | Yamamura |
| 7,312,887 B2 | 12/2007 | Wu |
| 7,475,333 B2 | 1/2009 | Otter et al. |
| 7,821,667 B2 | 10/2010 | Bahl et al. |
| 2001/0050684 A1 | 12/2001 | Smith |
| 2002/0030840 A1 | 3/2002 | Itaki et al. |
| 2002/0054339 A1 | 5/2002 | Arakawa |
| 2002/0120742 A1 | 8/2002 | Cherry |
| 2002/0171857 A1 | 11/2002 | Hisatomi et al. |
| 2002/0174444 A1 | 11/2002 | Gatto et al. |
| 2003/0004836 A1 | 1/2003 | Otter et al. |
| 2003/0030664 A1 | 2/2003 | Parry |
| 2003/0033368 A1 | 2/2003 | Tominaga |
| 2003/0058285 A1 | 3/2003 | Jin |
| 2003/0160989 A1 | 8/2003 | Chapin et al. |
| 2003/0184782 A1* | 10/2003 | Perkins et al. ............... 358/1.13 |
| 2003/0202808 A1 | 10/2003 | Katamoto |
| 2003/0218636 A1 | 11/2003 | McIntyre et al. |
| 2004/0012804 A1 | 1/2004 | Kasuga |
| 2004/0017580 A1 | 1/2004 | Kuroda |
| 2004/0019628 A1 | 1/2004 | Puri et al. |
| 2004/0105113 A1 | 6/2004 | Ishida et al. |
| 2004/0111418 A1* | 6/2004 | Nguyen et al. ............... 707/100 |
| 2004/0130744 A1 | 7/2004 | Wu et al. |
| 2004/0136023 A1 | 7/2004 | Sato |
| 2004/0143651 A1 | 7/2004 | Allen et al. |
| 2004/0179231 A1 | 9/2004 | Savino et al. |
| 2004/0215665 A1 | 10/2004 | Edgar et al. |
| 2004/0218201 A1 | 11/2004 | Lermant et al. |
| 2004/0227973 A1 | 11/2004 | Taylor |
| 2005/0012951 A1 | 1/2005 | Madril et al. |
| 2005/0030557 A1 | 2/2005 | Wiechers |
| 2005/0030577 A1 | 2/2005 | Wiechers |
| 2005/0043846 A1 | 2/2005 | Wiechers |
| 2005/0046886 A1 | 3/2005 | Ferlitsch |
| 2005/0088679 A1 | 4/2005 | Martin et al. |
| 2005/0099650 A1 | 5/2005 | Brown et al. |
| 2005/0111029 A1 | 5/2005 | Dehart |
| 2005/0180770 A1 | 8/2005 | Wong |
| 2005/0210227 A1 | 9/2005 | Emerson |
| 2005/0213136 A1 | 9/2005 | Noyama et al. |
| 2006/0029414 A1 | 2/2006 | Wong |
| 2006/0087682 A1 | 4/2006 | Lee |
| 2006/0114493 A1 | 6/2006 | Slightam |
| 2006/0120349 A1* | 6/2006 | Taylor et al. ............... 370/352 |
| 2006/0221391 A1 | 10/2006 | Okazawa et al. |
| 2007/0002368 A1 | 1/2007 | Corona |
| 2007/0008560 A1 | 1/2007 | Eschbach |
| 2007/0052992 A1 | 3/2007 | Yamada |
| 2007/0263242 A1 | 11/2007 | Takahashi |
| 2008/0037062 A1 | 2/2008 | Omino et al. |
| 2008/0180728 A1 | 7/2008 | Sekine |
| 2009/0033976 A1 | 2/2009 | Ding |
| 2009/0063718 A1 | 3/2009 | Sekine et al. |
| 2009/0086259 A1 | 4/2009 | Bailey et al. |
| 2009/0190150 A1 | 7/2009 | Selvaraj et al. |
| 2010/0082782 A1 | 4/2010 | Ding |
| 2010/0100832 A1 | 4/2010 | Wang et al. |
| 2010/0188688 A1 | 7/2010 | Selvaraj et al. |
| 2010/0225957 A1 | 9/2010 | Liu et al. |
| 2011/0026071 A1 | 2/2011 | Xiao |
| 2011/0026072 A1 | 2/2011 | Xiao |

FOREIGN PATENT DOCUMENTS

| | | |
|---|---|---|
| EP | 1394672 A2 | 8/2003 |
| GB | 2347766 | 9/2000 |
| GB | 2347766 A | 9/2000 |
| JP | 11065780 A | 3/1999 |
| JP | 2001/228996 | 8/2001 |
| JP | 2002/044344 A | 8/2002 |
| JP | 2005148953 A | 6/2005 |
| WO | WO 2004/070607 | 8/2001 |

OTHER PUBLICATIONS

Katayama et al., "Prototype of the device driver generation system for unix-like operating systems", Principles of Software Evolution, 2000, XP 010537526, 10 pages.

Katayama et al., "Proposal of a support system for device driver generation", Software Engineering conference, 1999, APSEC 1999 proceedings, XP010363982, 4 pages.

Sweet, Michael, "An Overview of the Commom UNIX Printing System", Easy Software Products, XP002501773, Jul. 2000, 8 pages.

Shaojie, Wang, et al., "Synthesizing operating system based device drivers in embedded systems", International Conference on Hardware/Software Codesign and system Synthesis, Oct. 2003, XP010688137, 8 pages.

European Patent Office, "European Search Report", application No. EP 08163260, dated Dec. 15, 2008, 9 pages.

Systems Inc., "PostScript Printer Description File Format Specification 4.3—Chapters 1 & 2", Internet Citation, XP002158174, retrieved from http://partners.adobe.com/asn/developer/pdfs/tn/5003.PPD_Spec_v4.3.pdf, 18 pages.

European Patent Office, "European Search Report", application No. EP 09151185, 8 pages.

Device Driver. Wikipedia, the free encyclopedia. [retrieved on Sep. 8, 2008]. Retrieved from the Internet: <URL: http://en.wikipedia.org/wiki/Device_driver>.

Page Description Language. Wikipedia, the free encyclopedia. [retrieved on Sep. 8, 2008]. Retrieved from the Internet: <URL: http://en.wikipedia.org/wiki/Page_description_language>.

European Patent Office, "European Searth Report," App. No. 05006220.7, dated Oct. 19, 2005 received on Nov. 2, 2005, 3 pages.

Current Claims from EP application 1586989, filed Mar. 22, 2005, 12 pages.

European Patent Office, "European Search Report", application No. EP 07250298, dated Feb. 23, 2010, 8 pages.

U.S. Appl. No. 10/823,064, filed Apr. 12, 2004 Office Action Sep. 8, 2010.

U.S. Appl. No. 11/846,869, filed Aug. 29, 2007, Office Action Jun. 24, 2010.

Xerox, Xerox 4595 Copier/Printer System Administration Guide, Jan. 2008, Xerox, pp. 1-402.

European Patent Office, Office Action, Application Number: 05 006 220.7, Applicant: Ricoh Company, Ltd, dated Feb. 2, 2011, 6 pages.

U.S. Appl. No. 12/253,823, filed Oct. 17, 2008, Final Office Action, Aug. 31, 2011.

U.S. Appl. No. 11/46,926, filed Aug. 29, 2007, Interview Summary, Sep. 21, 2011.

U.S. Appl. No. 12/533,999, filed Jul. 31, 2009, Office Action, Dec. 29, 2011.

U.S. Appl. No. 11/846,869, filed Aug. 29, 2007, Final Office Action, Oct. 27, 2011.

U.S. Appl. No. 12/019,610, filed Jan. 24, 2008, Final Office Action, Nov. 25, 2011.

U.S. Appl. No. 11/846,926, filed Aug. 29, 2007, Final Office Action, Aug. 15, 2011.

U.S. Appl. No. 11/345,503, filed Jan. 31, 2006, Notice of Allowance, May 24, 2010.

U.S. Appl. No. 11/846,869, filed Aug. 29, 2007, Final Office Action, mailed Dec. 17, 2010.

U.S. Appl. No. 12/253,823, filed Oct. 17, 2008, Office Action, mailed Nov. 10, 2010.

* cited by examiner

CAPABILITY-BASED CONTROL DEVICE DRIVER OF A COMPUTER PERIPHERAL DEVICE

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates to computer device drivers.

BACKGROUND

Peripheral devices can be coupled to computers. Application programs running on computers normally control the peripheral devices through device drivers, and a different specific device driver is used for each different kind of peripheral device. The device drivers typically are specific to the device type, the processor and operating system (platform) on which the device driver is running, and sometimes even to the type of data that the platform generates.

Each device driver serves as an interface for an operating system or application program to communicate with a peripheral device. Device drivers generally are hardware-dependent and each device driver is designed for a particular type of peripheral device hardware such as a printer, scanner, video adapter, network interface card, sound card, digital camera, etc.

For printer devices, device drivers are termed printer drivers and interact with application programs that generate a graphics object, which is data that can be printed on paper. A printer driver also controls printer device hardware features and settings, such as output paper tray and paper size. The printer driver converts requests issued from an application program into a printer-specific control language termed PDL (Page Description Language) such as PostScript, PCL, PJL, etc. Data communicated between a printer driver and printer hardware includes both printable data and hardware control commands mixed together in a PDL data stream.

Some high-end printer devices, especially those used in commercial or large-scale production printing environments, support job ticket-based printer control using commands expressed in Job Definition Format (JDF). JDF allows a printer driver to submit to the printer job ticket-based printer control commands in one data stream, and printable data in a second data stream that is sent to the printer at a separate time. In this approach, control commands and printable data are not mixed.

In a typical approach, to set up job-related settings for a particular job relating to a particular peripheral device, an application invokes the device driver and displays a static user interface through which the user can select various parameter values or other job settings. The driver interprets the selections and transforms the selections into a set of job setting data. The driver sends the job setting data to the device, either bundled with substantive job data or separately using a data structure or message termed a "job ticket."

Development of conventional device drivers is complex. A device manufacturer normally is required to devote substantial resources to develop a wide array of drivers to account for every permutation of devices made by the manufacturer and target computer platforms. Further, the user interface provided by a device driver is normally static and fixed, so that if the device is upgraded with a new feature, the manufacturer also must update the driver to present the new feature in an updated user interface. Thus, conventional device drivers usually comprise a distinct driver for each device type.

A related problem involves drivers that do not support vendor extensions. A Universal Serial Bus (USB) flash memory storage device is an example of a peripheral storage device that suffers from limitations associated with conventional device drivers. In current MICROSOFT WINDOWS environments, a typical USB storage device or "memory stick" does not require a user to install new software to read or write to the device, because each of MICROSOFT WINDOWS XP and MICROSOFT WINDOWS VISTA includes a standard USB storage device driver. While this is convenient, manufacturers of competing USB storage devices are required to conform to the standard features that are supported in the WINDOWS device driver. Manufacturer-specific features are not possible, and different manufacturers can only compete in the marketplace on the basis of price and form factor, not internal technical features.

Microsoft Corporation has introduced a document format termed XML Paper Specification (XPS) that includes a job ticket format termed PrintSchema for the purpose of controlling printer hardware.

Device drivers for scanner devices, termed scanner drivers, interact with application programs for retrieving a scanned image. Data communicated between the scanner driver and the scanner device includes scanned image data and scanner device-specific control commands. The image data and scanner control commands can be mixed together in a format such as TWAIN.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

In an embodiment, a data processing system, comprises a computer peripheral device comprising device capability producer logic and job ticket consumer logic; a device capability aware application comprising device capability consumer logic and job ticket producer logic; wherein the device capability producer logic is encoded in one or more computer-readable storage media for execution and when executed is operable to perform: receiving a request from the device capability aware application to obtain capabilities of the computer peripheral device; determining one or more capabilities of the computer peripheral device at a time of receiving the request; sending a first capability description of the capabilities from the computer peripheral device to the device capability aware application; wherein the device capability consumer logic is encoded in one or more computer-readable storage media for execution and when executed is operable to perform: receiving the first capability description from the computer peripheral device; creating one or more graphical user interface (GUI) elements based upon the first capability description and causing displaying the GUI elements; receiving user input representing one or more selections of the GUI elements; wherein the job ticket producer logic is encoded in one or more computer-readable storage media for execution and when executed is operable to perform: creating job ticket data that describes a job for the computer peripheral device to perform, based on the GUI elements that were selected as represented in the user input; sending the job ticket data to the peripheral device; wherein the job ticket consumer logic is encoded in one or more computer-readable storage media for execution and when executed is operable to perform: transforming the job ticket data into one or more device-specific operational commands for the computer peripheral device; causing the computer peripheral device to execute the operational commands.

In an embodiment, the computer peripheral device comprises any of a printer, a multifunction printing device, a scanner, a finishing machine, a digital camera, or a monitor. In an embodiment, the device capability aware application comprises a device driver.

In an embodiment, the device capability aware application further comprises data communication logic which when executed causes sending device independent job data from the device capability aware application to the computer peripheral device.

In an embodiment, the device capability producer logic further comprises logic which when executed is operable to perform receiving a second request from the device capability aware application to obtain capabilities of the computer peripheral device; determining one or more second capabilities of the computer peripheral device at a time of receiving the second request, wherein the second capabilities include changed capabilities of the computer peripheral device; sending a second capability description from the computer peripheral device to the device capability aware application. The second request may be triggered in various ways. In one implementation, if the peripheral device has been changed (such as to include new, upgraded, or otherwise changed capabilities, features or options), the device capability consumer logic can initiate another process of obtaining the then-current capabilities of the peripheral device to re-generate the GUI based on the changed capabilities. In one embodiment, the approaches herein enable re-generating a new driver reflecting a new feature in a printer or other peripheral device.

In an embodiment, the job ticket data comprises a subset of the first capability description. In an embodiment, the first capability description comprises a list of features of the computer peripheral device, property names of properties of the features, values of the properties, and options for the properties, expressed in any of Job Definition Format (JDF) or Print Schema Specification.

In an embodiment, the first capability description comprises a list of features of the computer peripheral device and one or more feature constraints, wherein the one or more feature constraints comprise (a) limitations on the availability of the capabilities or (b) settings for capabilities that are required by an availability of another capability or by another setting of another capability.

In an embodiment, the device capability consumer logic further comprises logic which when executed causes generating and displaying a list of a plurality of available peripheral devices, receiving second user input representing a selection of one of the available peripheral devices, and sending the request to the selected one of the available peripheral devices represented in the second user input.

In an embodiment, a computer-readable data storage medium is encoded with one or more sequences of instructions which when executed by one or more processors cause the one or more processors to perform: sending, to a computer peripheral device, a request to obtain capabilities of the computer peripheral device; receiving a first capability description from the computer peripheral device, wherein the first capability description describes one or more capabilities, features or functions of the device at the time of the request; creating one or more graphical user interface (GUI) elements based upon the first capability description and causing displaying the GUI elements; receiving user input representing one or more selections of the GUI elements; creating job ticket data that describes a job for the computer peripheral device to perform, based on the GUI elements that were selected as represented in the user input; sending the job ticket data to the peripheral device; wherein the job ticket data describes one or more device settings that the computer peripheral device can transform to device commands.

In an embodiment, the computer-readable storage medium comprises a device driver.

In an embodiment, a computer-implemented method comprises sending, to a computer peripheral device, a request to obtain capabilities of the computer peripheral device; receiving a first capability description from the computer peripheral device, wherein the first capability description describes one or more capabilities, features or functions of the device at the time of the request; creating one or more graphical user interface (GUI) elements based upon the first capability description and causing displaying the GUI elements; receiving user input representing one or more selections of the GUI elements; creating job ticket data that describes a job for the computer peripheral device to perform, based on the GUI elements that were selected as represented in the user input; sending the job ticket data to the peripheral device; wherein the job ticket data describes one or more device settings that the computer peripheral device can transform to device commands.

Other embodiments encompass a computer-implemented method and an apparatus configured according to the steps described above.

DETAILED DESCRIPTION

In the following description, for the purposes of explanation, numerous specific details are set forth in order to provide a thorough understanding of the present invention. It will be apparent, however, that the present invention may be practiced without these specific details. In other instances, wellknown structures and devices are shown in block diagram form in order to avoid unnecessarily obscuring the present invention.

1.0 Structural and Functional Overview

Generally, the technology disclosed herein enables software that is developed and deployed to support new peripheral devices, and new features of the peripheral devices, by exchanging device capabilities and job tickets. With the approach herein, a manufacturer of a peripheral device can introduce new products and new features without releasing a new device driver and without forcing users to update their software.

In an embodiment, when a device driver implements the techniques herein, an application program communicates with the device driver in the same manner as the application program communications with a conventional device driver. Thus, no change in the application program is needed to use a device driver that implements the techniques herein.

In an embodiment, a single driver can operate with all devices that can describe their own capabilities and features in a manner that the driver understands. Therefore, a single driver can work with multiple peripheral devices and there is no need to write a large array of drivers for every permutation of peripheral device and computer platform.

In an embodiment, job data is separable from job settings and device capability data. The driver sends a job ticket to the peripheral device, but the driver does not need to send job data to the device at the same time as the job ticket.

Embodiments are operable in environments in which job data is defined separately from job settings. For example, in a printing system, an application program, device driver, and printer device can generate and consume job data independently of job setting data. In an embodiment, Web Service printing methods are used. The application program and driver send the printer a PrintTicket message or JobTicket message separately from a job data package and the printer device processes the two parts separately and applies the settings in the PrintTicket while generating the print output from the job data.

2.0 Example of Implementation

Figure 1:
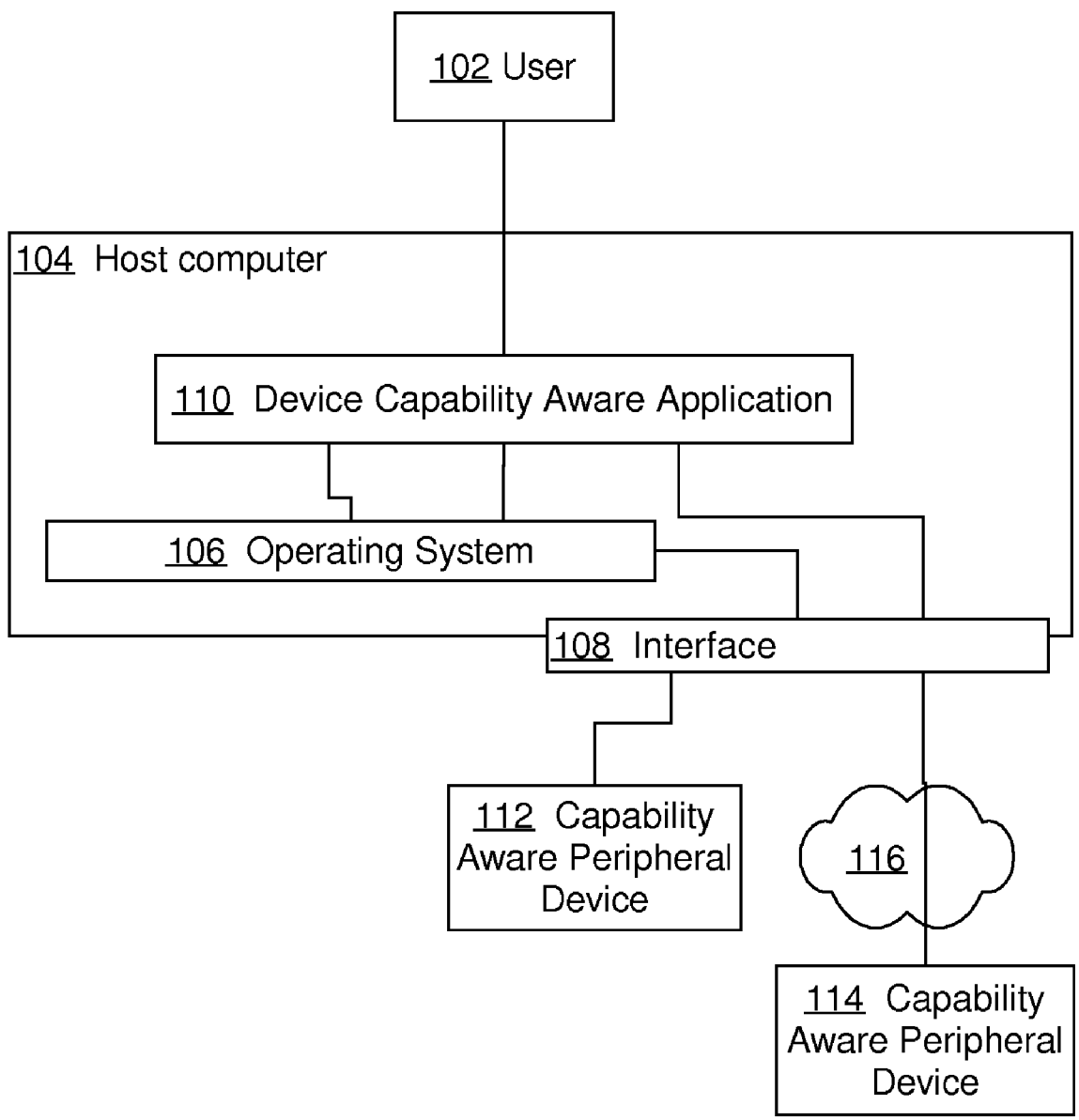
FIG. 1 illustrates an example computing system in which a device capability aware application and a capability aware peripheral device may be used.

FIG. 1 illustrates an example computing system in which a device capability aware application and a capability aware peripheral device may be used. In an embodiment, a user 102 interacts with a host computer 104, which may comprise a personal computer, workstation, server, wireless computing device, or any other form of host computer. The host computer 104 comprises an operating system 106 that hosts and controls a device capability aware application program 110. The host computer further comprises an interface 108 that is coupled, directly or indirectly through one or more networks 116, to one or more capability aware peripheral devices 112, 114.

Examples of operating system 106 include LINUX, UNIX, MACOS, and MICROSOFT WINDOWS. The device capability aware application program 110 may comprise any computer program that can perform useful operations in connection with the peripheral devices 112, 114. Examples of application program 110 include a device driver, word processor, a spreadsheet, an e-mail client, and a database client.

Interface 108 may comprise any hardware, firmware, software, or combination that can communicate data between the host computer 104 and the peripheral devices 112, 114 and network 116. Examples of interface 108 include a network interface card (NIC) comprising an Ethernet interface, Universal Serial Bus (USB) interface, serial interface, IEEE 1394 (FIREWIRE) interface, and parallel port. Proprietary data communications interfaces also may be used and embodiments do not require standards-based interfaces.

Embodiments may be used with any kind of computer peripheral device. Examples of peripheral devices 112, 114 with which embodiments may be used include printers, scanners, multifunction printers, finishing devices, storage systems, etc. FIG. 1 illustrates two (2) peripheral devices 112, 114 solely to show a clear example and embodiments may operate with any number of peripheral devices that are different or the same.

The device capability aware application 110 comprises one or more stored sequences of instructions, or other software elements, that implement the functions described herein. In general, the device capability aware application 110 can receive function calls from the operating system 106 or application program 110, and can interact with any of the peripheral devices 112, 114 to cause the peripheral devices to perform a job that the application program initiates. The device capability aware application 110 may comprise a device driver. The device capability aware application 110 can operate with any peripheral device that can provide a description of its features or capabilities as further described herein. The device capability aware application 110 may be integrated into operating system 106, application program 110, or other software elements or firmware elements of host computer 104, and embodiments do not require implementing the device capability aware application as a standalone software element.

Figure 2:
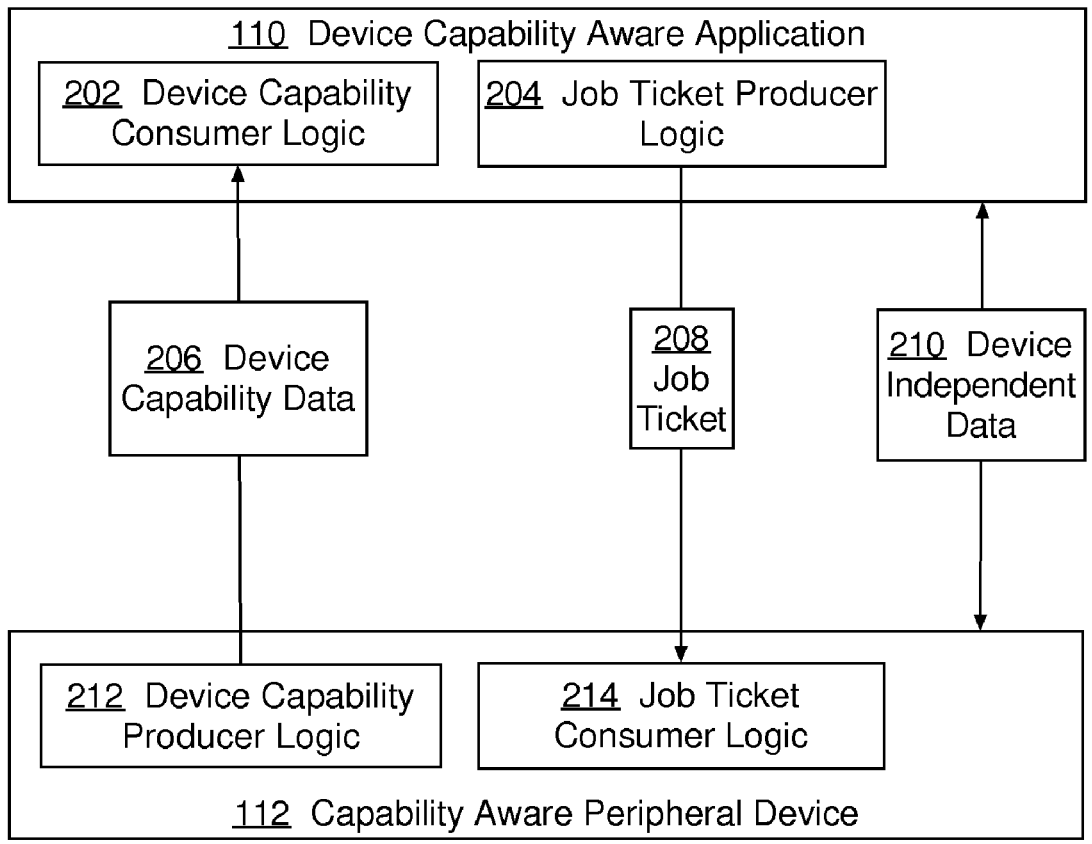
FIG. 2 illustrates data communicated between the device capability aware application and a capability aware peripheral device of FIG. 1.

FIG. 2 illustrates data communicated between the device capability aware application and a capability aware peripheral device of FIG. 1. In an embodiment, device capability aware application 110 comprises device capability consumer logic 202 and job ticket producer logic 204. A capability aware peripheral device 112 comprises device capability producer logic 212 and job ticket consumer logic 214.

The device capability consumer logic 202 can receive and understand device capability data 206. The job ticket producer logic 204 can produce and send job ticket data 208 to a device capability aware device or application 110. The device capability producer logic 212 can produce and send device capability data 206 to the device capability aware application 110. The job ticket consumer logic 214 can receive, understand and execute job ticket data as commands for the capability aware peripheral device 112.

Device capability data 206 comprises data that describes one or more capabilities, features or functions of the capability aware peripheral device 112. The device 112 generates the device capability data 206 and provides it to the device capability aware application 110. The device capability data 206 is generated at the time of a request from the application 110, and therefore the data 206 can include a description of all then-current capabilities, features and functions of the device 112. Device capability data 206 may indicate languages that the device 112 supports so that a resulting user interface generated using the techniques herein will be appropriate for various languages.

The device capability data 206 may be expressed in various formats, methods and mechanisms. Examples of device capability data 206 that may be used in various embodiments include XML, XML-based representations, HTML, etc. Embodiments are not limited to XML or any other specific method or mechanism for describing capabilities of a device. However, the representation of a device capabilities represented in device capability data 206 is separate from the device independent data 210.

Job ticket 208 comprises a statement of settings, sent from application 110 to device 112, which instruction the device how to process a particular job associated with some or all of the device independent data 210. In an embodiment, application 110 communicates one or more job tickets 208 to the peripheral device 112. Generally, job tickets 208 comprise data that informs the peripheral device 112 about selections that a user, application or system has made from among available capabilities of the peripheral device as represented in device capability data 206. For example, job tickets 208 may identify paper trays, finishing options, or other job settings. In various embodiments, job tickets 208 may be expressed in XML, in the format of Web Services tickets, sets of name-value pairs, or in other descriptive text or data.

Device independent data 210 comprises data that can be used in the device 112 but does not comprise any hardware-specific command. For a device that processes still images, such as a scanner, digital camera, or monitor, device independent data 210 may comprise JPEG, TIFF, or GIF image data. For a printer device, the device independent data 210 may comprise a PDF file, EPS, PostScript file, which do not include hardware control commands. Alternatively, PCL data and any PDL having none or a minimum set of hardware control commands can be used as the device independent data 210.

In an embodiment, device capability aware application 110 and capability aware peripheral device 112 communicate data using any form of basic application-layer communication protocol that both the device capability aware application 110 and capability aware peripheral device 112 can support. FIG. 2 shows one capability aware peripheral device 112 to illustrate a clear example, but the communications of FIG. 2 may occur between the device capability aware application 110 and any capability aware peripheral device 112 with which it operates.

In one embodiment, the protocol comprises Web Services and each of the device capability aware application 110 and capability aware peripheral device 112 implement Web Services functions. For example, each of the device capability aware application 110 and capability aware peripheral device 112 may comprise Web Services logic that can generate application-layer messages according to the Web Services standards of the World Wide Web Consortium (w3c), and that can interpret and act upon such messages.

Figure 3:
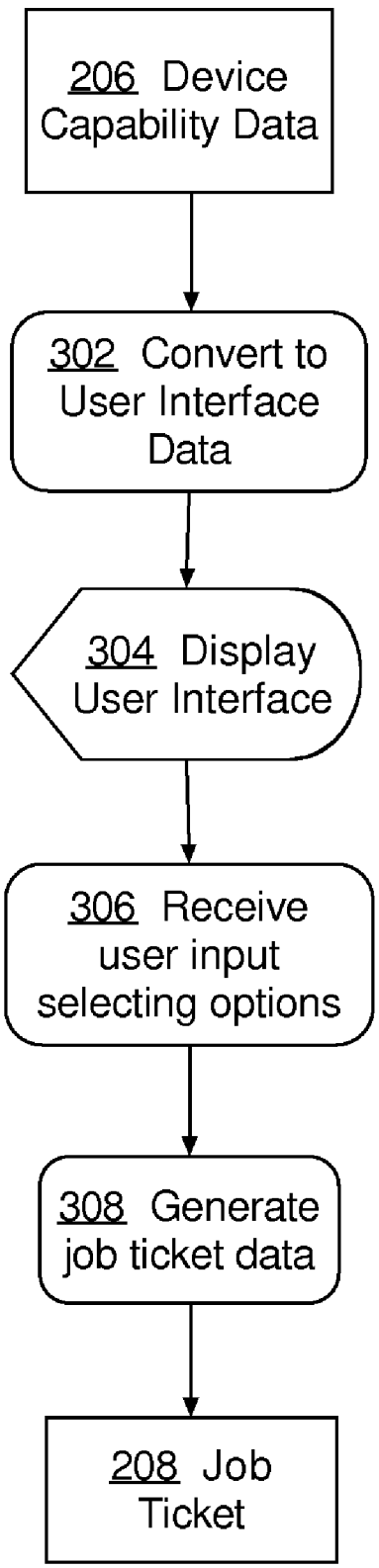
FIG. 3 illustrates an example process of capability-based control of a computer peripheral device.

FIG. 3 illustrates an example process of capability-based control of a computer peripheral device.

In an embodiment, a device capability aware device generates device capability data 206 and sends the data to a device capability aware application. For example, as in FIG. 2, device 112 generates data 206 describing capabilities, features and functions of the device and sends the data to the application 110. Generating the data 206 may occur, for example, in response to the device 112 receiving a request from the application 110. The application 110 may issue such a request in response to receiving a request from another application to interact with the device 112, for example, to print a document, scan a document, etc.

At step 302, in response to receiving the device capability data 206, the device capability aware application converts the device capability data into user interface data and causes the user interface to be displayed as shown at block 304. For example, the application 110 converts data 206 into a tree view, causes the view to be displayed on a display of the host computer 104.

In step 306, user input selecting one or more options is received. For example, the application 110 receives user input representing user selections of options in the tree view.

In response, in step 308 job ticket data is generated based on the selections. For example, application 110 converts the received user input into the job ticket 208, based on the device capability data 206. In one embodiment, the conversion may comprise creating a job ticket 208 in an XML document by transforming one or more XML elements of the device capability data 206 according to an XML stylesheet transformation (XSLT) that also receives the user input.

One result of this approach is that even features that were recently added to the device 112 are reflected or listed in the device capability data 206. Further, the device capability aware application 110 is not required to know about such recently added features or new capabilities or what device control commands are required to invoke or use the recently added features or new capabilities. Instead, the device 112 describes its own features and command requirements to the application 110. The application 110 obtains user input about desired job settings, and produces a job ticket 208 that reflects such settings based on the features and command requirements in the device capability data 206. Moreover, the steps described herein may be repeated to acquire updated device capability data from a device to reflect updated or changed capabilities of a device. The repetition may be triggered in various ways. In one implementation, if the peripheral device has been changed (such as to include new, upgraded, or otherwise changed capabilities, features or options), the device capability consumer logic can initiate another process of obtaining the then-current capabilities of the peripheral device to re-generate the GUI based on the changed capabilities. In one embodiment, the approaches herein enable re-generating a new driver reflecting a new feature in a printer or other peripheral device.

In an embodiment, device capability data 206 and job ticket 208 are expressed in any of several job ticket formats such as Job Definition Format (JDF) and the Print Schema Specification, which is a part of the XML Paper Specification (XPS) of Microsoft Corporation. Other job ticket formats may be used and embodiments are not limited to using JDF or XPS.

Generally, device capability data 206 comprises a list of device features. In an embodiment, each feature is defined using a name, user interface display name, selection type. Examples of selection types include a selection list or enumeration, number, and string. A device capability definition may comprise a feature constraint, which is a limitation on the availability of one capability of the device, or a possible setting for that capability, which is dependent upon the availability of another capability or setting of the device.

TABLE 1 is an example of device capability data 206 expressed in Print Schema format:

TABLE 1

EXAMPLE DEVICE CAPABILITY DATA

<psf:Feature name="psk:JobDuplexAllDocumentsContiguously">
<psf:Property name="psf:SelectionType>
   <psf:Value xsi:type= "xsd:QName">psk:PickOne</psf:Value>
</psf:Property>
<psf:Property name="psk:DisplayName">
   <psf:Value xsi:type="xsd:string">Duplex</psf:Value>
</psf:Property>
</psf:Option name="psk:OneSided" constrained="psk:None">
<psf:Property name="psk:DisplayName">
<psf:Value xsi:type="xsd:string">Off</psf:Value>
</psf:Property>
</psf:Option>
<psf:Option name="psk:TwoSidedLongEdge" constrained="psk:None">
<psf:Property name="psk:DisplayName">
<psf:Value xsi:type="xsd:string">Long Edge</psf:Value>
</psf:Property>
<psf:Option name="psk:TwoSidedShortEdge" constrained="psk:None">
<psf:Property name="psk:DisplayName">

TABLE 1-continued

EXAMPLE DEVICE CAPABILITY DATA

```
<psf:Value xsi:type="xsd:string">Short Edge</psf:Value>
</psf:Property>
</psf:Option>
</psf:Feature>
```

Figure 4:
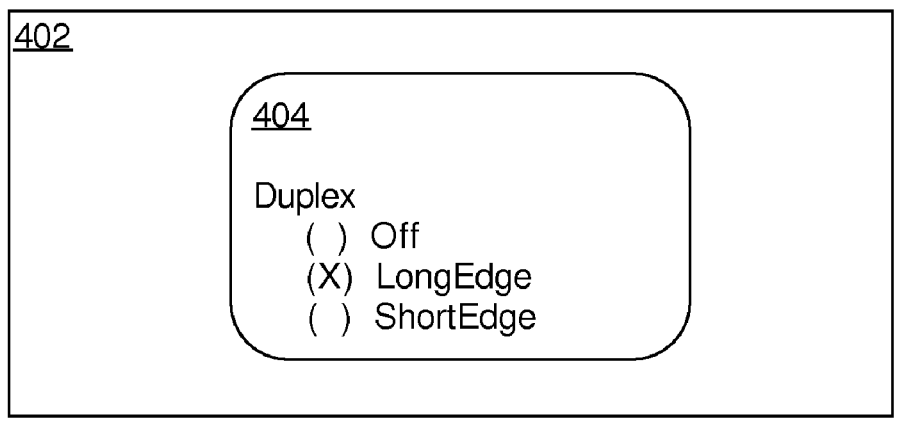
FIG. 4 illustrates an example graphical user interface for a peripheral device in which a Long Edge option is selected.

FIG. 4 illustrates an example graphical user interface for a peripheral device in which a Long Edge option is selected. The example of FIG. 4 corresponds to the example device capability data of Table 1.

In the example of FIG. 4, a screen display 402 generated by an application program comprises a user interface panel 404 configured for allowing a user to interact with capabilities, features or functions of a peripheral device. For example, assume that the device is a printer and one feature allows printing duplex pages. The duplex option may have values of Off, Long Edge, or Short Edge, so that the user can specify how duplexing is arranged. In FIG. 4, the Long Edge option is selected. Selection of the Long Edge option is an example of providing user input that is received at step 306 of FIG. 3.

The user selection of the Long Edge option of FIG. 4 can be converted to a job ticket 208 at step 308 of FIG. 3 having the form shown in Table 2:

TABLE 2

EXAMPLE JOB TICKET

```
<psf:Feature name= "psk:JobDuplexAllDocumentsContiguously">
<psf:Option name= "psk:TwoSidedLongEdge" />
</psf:Feature>
```

In an embodiment, a job ticket 208 having the format of Table 2 may be executed in a capability aware peripheral device 112 using job ticket consumer logic 214. In this approach, the combination of device capability data 206 and the job ticket 208 carry enough information for the application 110 to provide a user with a user interface representing features of the device and receive a user selection of an option or type appropriate for a particular job. However, neither the device capability aware application 110 nor any other software interacting with the application is required to be coded with an understanding of the substantive meaning of capabilities, features and functions.

Thus, a device manufacturer is not required to produce a custom device driver with specialized user interface for each permutation of device and platform. Further, the manufacturer can introduce new products and new features into existing products without releasing a new device driver and without requiring end user to upgrade their computers with the new device driver.

Figure 5:
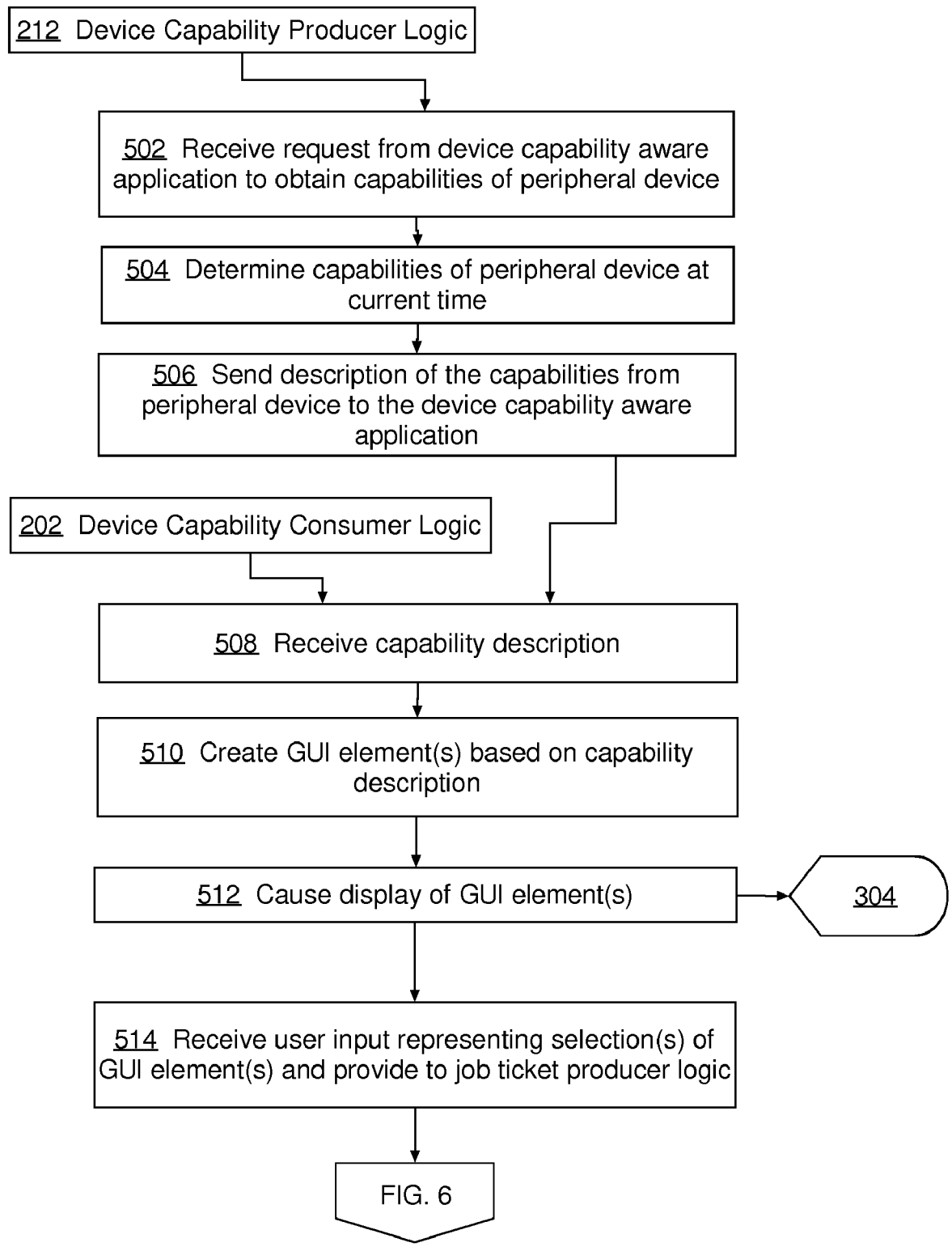
FIG. 5 illustrates example functions of device capability producer logic and device capability consumer logic.

FIG. 5 illustrates example functions of device capability producer logic and device capability consumer logic.

In an embodiment, device capability producer logic 212, hosted in a device, performs the following functions. Step 502 comprises receiving a request from a device capability aware application to obtain capabilities of a peripheral device. For example, device capability producer logic 212 of device 112 receives a request from application 110 to provide the capabilities of the device.

In response, in step 504, the capabilities of the peripheral device at the current time are determined. Step 504 may comprise reading a registry, configuration file, management information base (MIB), or other repository of information that describes then-current capabilities of the device.

In step 508, a description of the capabilities is sent from the peripheral device to the device capability aware application. Step 508 may comprise forming device capability data 206 according to an XML schema such as the PrintSchema and encoding then-current capabilities, features and functions in the data. The data is sent to the application, as indicated by the arrow connecting step 506 to step 508.

In step 508, device capability consumer logic 202 receives the capability description from the device. In response, in step 510 the logic 202 creates one or more GUI elements based on the capability description and in step 512 the logic causes the GUI elements to be displayed. For example, the GUI of FIG. 4 is created and provided to a display or to the operating system 106 for display.

Step 514 comprises receiving user input representing selections of one or more GUI elements, and providing the user input to job ticket producer logic. For example, the device capability consumer logic 202 receives user input in the form of mouse clicks, keyboard strokes, or data representing user input, from the operating system 106 or its device drivers. The logic 202 transforms the selections if necessary and provides the user selections to job ticket producer logic 204 of application 110.

Figure 6:
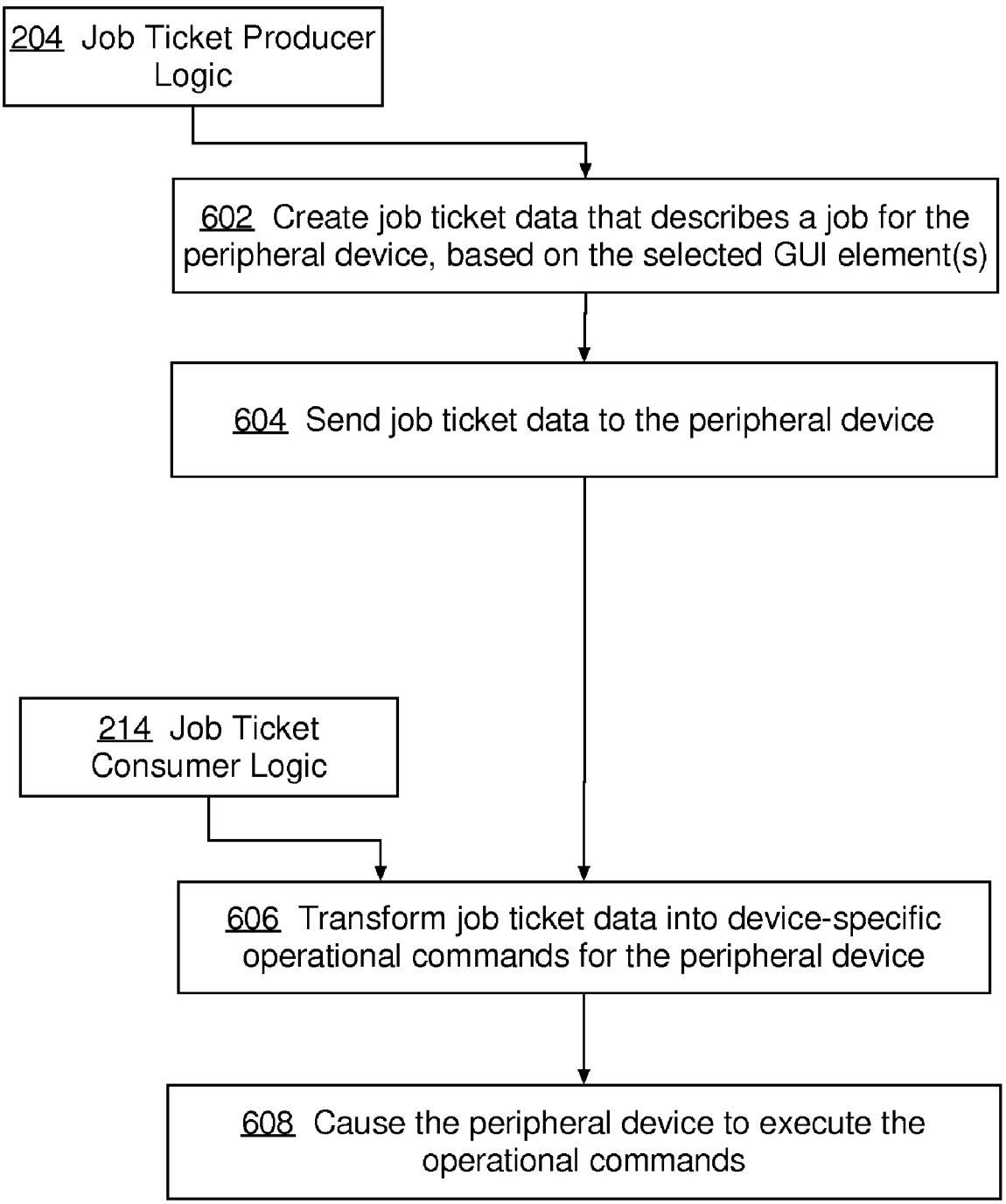
FIG. 6 illustrates example functions of job ticket producer logic and job ticket consumer logic.

FIG. 6 illustrates example functions of job ticket producer logic and job ticket consumer logic.

In step 602, the job ticket producer logic 204—having received the user selections from step 514 of FIG. 5—creates job ticket data that describes a job for the peripheral device, based on the selected GUI elements. Device capability data 206 is used to determine the job ticket data. For example, a job ticket 208 may comprise a transformation of the device capability data 206 in accordance with or based on the user selections of step 514. In step 604, the job ticket producer logic sends the job ticket data to the peripheral device.

In response, in step 606, the job ticket consumer logic 214 transforms the job ticket data into one or more device-specific operational commands for the peripheral device. Step 606 may comprise transforming job ticket 208 from a PrintSchema representation into one or more function calls, command-line instructions, method invocations, or other commands to the device. In an embodiment, the PrintSchema representation is transformed using an XML parser from Microsoft Corporation. In step 608, the job ticket consumer logic causes the device to execute the operational commands.

Figure 7:
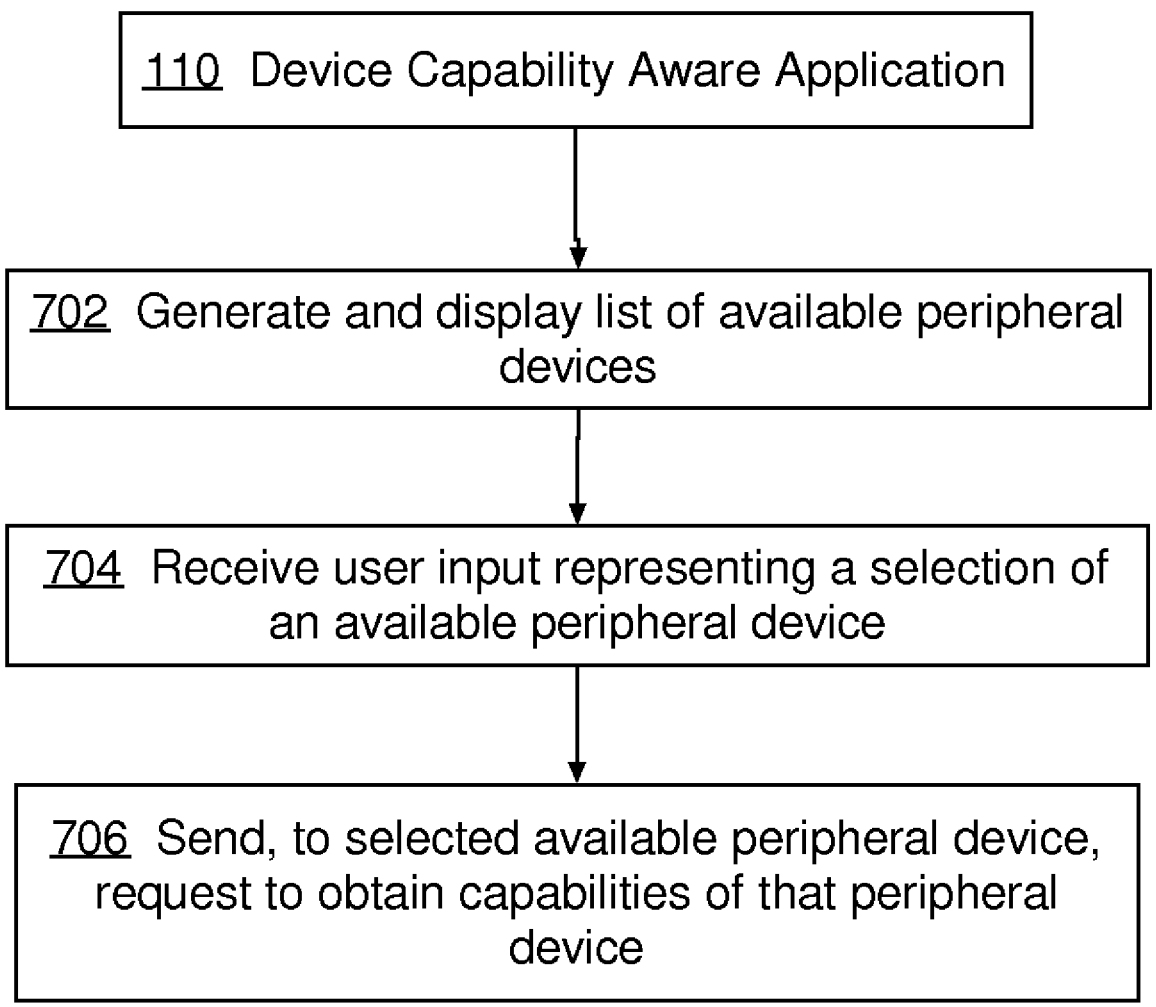
FIG. 7 illustrates example functions of a device capability aware application.

FIG. 7 illustrates example functions of a device capability aware application.

In step 702, a device capability aware application 110 generates and displays a list of available peripheral devices. For example, device capability aware application 110 receives a request from another application program, such as a word processor, to print a document. In response, the device capability aware application 110 determines which devices are known or available and causes displaying a list of all such devices. The devices can be discovered using a conventional discovery protocol. The list can be displayed in a graphical user interface using a widget such as a combo box. The list can be organized by device category or by device manufacturer. For example, the list may show only printers, only scanners, or only another category of device. As another example, the list may show only devices of Ricoh Co. Ltd., Tokyo, Japan.

In step 704, the device capability aware application receives user input representing a selection of an available peripheral device. For example, user input representing selection of one option in the combo box is received.

Step 706 comprises sending, to the selected available peripheral device, a request to obtain capabilities of that peripheral device. For example, the device capability aware application 110 sends a request to device 112 to obtain the then-current capabilities of that device for use in displaying the capabilities to a user and receiving user input for job settings for printing the document. Performing step 706 may result in triggering step 502 of FIG. 5.

One result of FIG. 5, FIG. 6 is that an application can request current capabilities of a device, generate a user interface representing the capabilities, receive user input for particular job settings, and provide the job settings to the device in a manner that causes the device to execute the job settings. The application is not required to understand the capabilities or have custom code that can generate the user interface. The application can be a universal device driver.

The method herein eliminates the necessity of releasing a new device driver for every new model of a device having a new feature set.

Further, the capabilities data is dynamically generated at the time of a request to interact with a peripheral device, based on then-current device capabilities. The approaches herein and the device capability aware application can work with any peripheral device that is capable of describing its capabilities in response to a request from the device capability aware application, and capable of parsing and executing commands expressed in a job ticket. No change is required in an application program or the way that a user interacts with the application program. No change is required in the operating system.

In an embodiment, the user experience is not changed as the user application continues to interoperate with a device driver in the form of device capability aware application 110, which acts as a universal device driver. However, the user interface with which the user interacts may vary from time to time as the peripheral device is updated, but no update to the device capability aware application 110 on the host computer is required.

3.0 Hardware Overview

Figure 8:
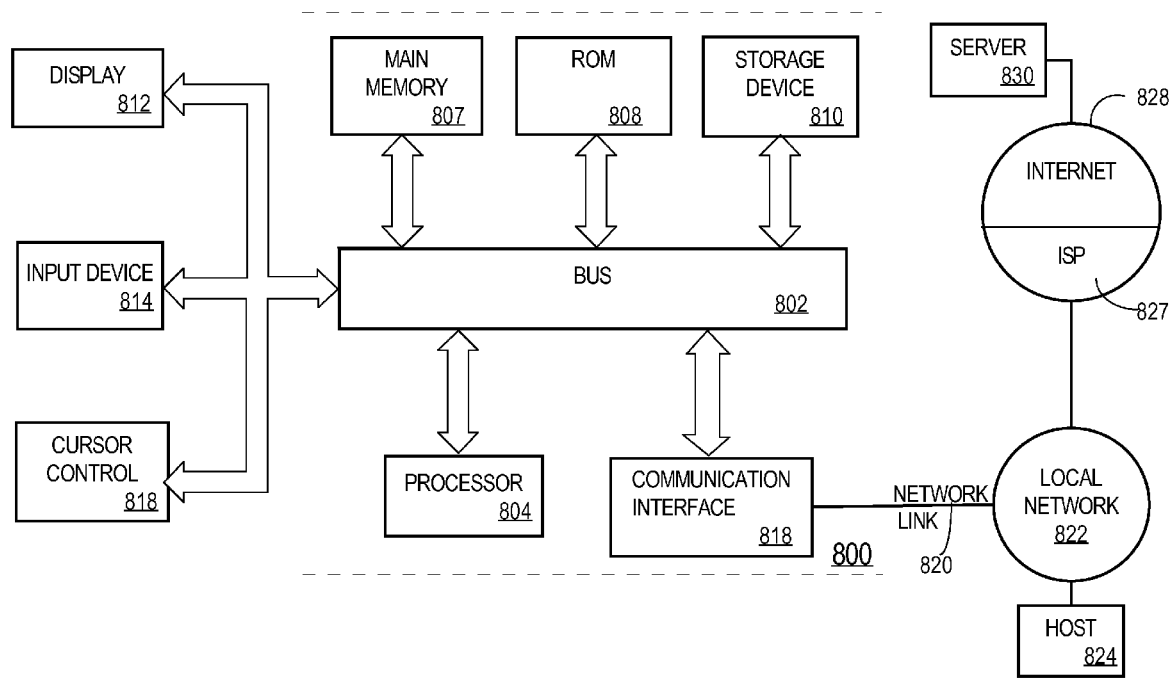
FIG. 8 is a block diagram that illustrates a computer system upon which an embodiment of the invention may be implemented.

FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for implementing the techniques described herein. According to one embodiment of the invention, those techniques are performed by computer system 800 in response to processor 804 executing one or more sequences of one or more instructions contained in main memory 806. Such instructions may be read into main memory 806 from another machine-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 800, various machine-readable media are involved, for example, in providing instructions to processor 804 for execution. Such a medium may take many forms, including but not limited to storage media and transmission media. Storage media includes both non-volatile media and volatile media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution. In this manner, computer system 800 may obtain application code in the form of a carrier wave.

4.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A data processing system, comprising:
   a computer peripheral device comprising device capability producer logic and job ticket consumer logic;
   a device capability aware application comprising device capability consumer logic and job ticket producer logic;
   wherein the device capability producer logic is encoded in one or more computer-readable storage media for execution and when executed is operable to perform:
      at a time that the device capability aware application is requested to print or scan a document:
         receiving a request from the device capability aware application to obtain capabilities of the computer peripheral device;
         recognizing, at a time of receiving the request, one or more available functions of the computer peripheral device;
         in response to receiving the request, generating a first capability description describing one or more capabilities of the computer peripheral device based on the one or more available functions at the time of receiving the request;
         sending the first capability description of the capabilities from the computer peripheral device to the device capability aware application;
   wherein the device capability consumer logic is encoded in one or more computer-readable storage media for execution and when executed is operable to perform:
      receiving the first capability description from the computer peripheral device;
      creating one or more graphical user interface (GUI) elements based upon the first capability description and causing displaying the GUI elements;
      receiving user input representing one or more selections of the GUI elements;
   wherein the job ticket producer logic is encoded in one or more computer-readable storage media for execution and when executed is operable to perform:
      creating job ticket data that describes a job for the computer peripheral device to perform, based on the GUI elements that were selected as represented in the user input;
      sending the job ticket data to the peripheral device;
   wherein the job ticket consumer logic is encoded in one or more computer-readable storage media for execution and when executed is operable to perform:
      transforming the job ticket data into one or more device-specific operational commands for the computer peripheral device;
      causing the computer peripheral device to execute the operational commands;
   wherein the first capability description comprises a list of features of the computer peripheral device and one or more feature constraints, wherein the one or more feature constraints comprise limitations on the availability of the capabilities or settings for capabilities that are required by an availability of another capability or by another setting of another capability.

2. The system of claim 1, wherein the computer peripheral device comprises any of a printer, a multifunction printing device, a scanner, a finishing machine, a digital camera, or a monitor.

3. The system of claim 1, wherein the device capability aware application comprises a device driver.

4. The system of claim 1, wherein the device capability producer logic further comprises logic which when executed is operable to perform:
   receiving a second request from the device capability aware application to obtain capabilities of the computer peripheral device;
   recognizing one or more available functions of the computer peripheral device;
   in response to receiving the second request, generating a second capability description describing one or more second capabilities of the computer peripheral device based on the one or more available functions at a time of receiving the second request, wherein the second capabilities include changed capabilities of the computer peripheral device;
   sending the second capability description from the computer peripheral device to the device capability aware application.

5. The system of claim 1, wherein the job ticket data comprises a subset of the first capability description.

6. The system of claim 1, wherein the first capability description comprises a list of features of the computer peripheral device, property names of properties of the features, values of the properties, and options for the properties, expressed in any of Job Definition Format (JDF) or Print Schema Specification.

7. The system of claim 1, wherein the device capability consumer logic further comprises logic which when executed causes generating and displaying a list of a plurality of available peripheral devices, receiving second user input representing a selection of one of the available peripheral devices, and sending the request to the selected one of the available peripheral devices represented in the second user input.

8. A computer-readable data storage medium encoded with one or more sequences of instructions which when executed by one or more processors cause the one or more processors to perform:
    at a time that a device capability aware application is requested to print or scan a document:
        sending, to a computer peripheral device, a request to obtain capabilities of the computer peripheral device;
        receiving a first capability description from the computer peripheral device, wherein the first capability description describes one or more available capabilities, features or functions of the device recognized at a time of receiving the request, and generated by the device at the time of the request;
    creating one or more graphical user interface (GUI) elements based upon the first capability description and causing displaying the GUI elements;
    receiving user input representing one or more selections of the GUI elements;
    creating job ticket data that describes a job for the computer peripheral device to perform, based on the GUI elements that were selected as represented in the user input;
    sending the job ticket data to the peripheral device;
    wherein the job ticket data describes one or more device settings that the computer peripheral device can transform to device commands;
    wherein the first capability description comprises a list of features of the computer peripheral device and one or more feature constraints, wherein the one or more feature constraints comprise limitations on the availability of the capabilities or settings for capabilities that are required by an availability of another capability or by another setting of another capability.

9. The computer-readable storage medium of claim 8, wherein the computer peripheral device comprises any of a printer, a multifunction printing device, a scanner, a finishing machine, a digital camera, or a monitor.

10. The computer-readable storage medium of claim 8, comprising a device driver.

11. The computer-readable storage medium of claim 8, wherein the job ticket data comprises a subset of the first capability description.

12. The computer-readable storage medium of claim 8, wherein the first capability description comprises a list of features of the computer peripheral device, property names of properties of the features, values of the properties, and options for the properties, expressed in any of Job Definition Format (JDF) or Print Schema Specification.

13. A computer-implemented method, comprising:
    at a time that a device capability aware application is requested to print or scan a document:
        sending, to a computer peripheral device, a request to obtain capabilities of the computer peripheral device;
        receiving a first capability description from the computer peripheral device, wherein the first capability description describes one or more available capabilities, features or functions of the device recognized at a time of the request, and generated by the device at the time of the request;
    creating one or more graphical user interface (GUI) elements based upon the first capability description and causing displaying the GUI elements;
    receiving user input representing one or more selections of the GUI elements;
    creating job ticket data that describes a job for the computer peripheral device to perform, based on the GUI elements that were selected as represented in the user input;
    sending the job ticket data to the peripheral device;
    wherein the job ticket data describes one or more device settings that the computer peripheral device can transform to device commands;
    wherein the first capability description comprises a list of features of the computer peripheral device and one or more feature constraints, wherein the one or more feature constraints comprise limitations on the availability of the capabilities or settings for capabilities that are required by an availability of another capability or by another setting of another capability.

\* \* \* \* \*

UNITED STATES PATENT AND TRADEMARK OFFICE
CERTIFICATE OF CORRECTION

PATENT NO. : 8,214,548 B2  
APPLICATION NO. : 11/846884  
DATED : July 3, 2012  
INVENTOR(S) : Hitoshi Sekine et al.

Page 1 of 1

It is certified that error appears in the above-identified patent and that said Letters Patent is hereby corrected as shown below:

Page 1
Section 56
References Cited
U.S. Patent Documents

Insert --5,692,111 A 11/1997 Marbry et al.-- between 5,513,126 A 4/1996 Harkins et al. and 5,768,483 A 6/1998 Maniwa et al.

Page 2
U.S. Patent Documents
Line 25

Insert --2002/0184294 A1 12-2002 Volkoff et al.-- between 2002/0174444 A1 11/2002 Gatto et al. and 2003/0004836 A1 1/2003 Otter et al.

Signed and Sealed this
Twenty-eighth Day of August, 2012

David J. Kappos
*Director of the United States Patent and Trademark Office*